United States Patent [19]

Sugino et al.

[11] 4,409,284
[45] Oct. 11, 1983

[54] POROUS MOLDINGS MADE OF ACCUMULATED MASS OF STRINGY OR THREADY EXTRUDATES

[75] Inventors: Morihiko Sugino, Kamakura; Eiji Saura, Fujisawa, both of Japan

[73] Assignee: Kabushiki Kaisha Kobe Seiko Sho, Kobe, Japan

[21] Appl. No.: 282,594

[22] Filed: Jul. 13, 1981

[30] Foreign Application Priority Data

Jul. 15, 1980 [JP] Japan ................................ 55-97101
Jul. 15, 1980 [JP] Japan ................................ 55-97102
Jan. 20, 1981 [JP] Japan ................................ 56-7598

[51] Int. Cl.³ ............................................. B32B 5/02
[52] U.S. Cl. .............................. 428/304.4; 264/29.3; 501/80; 501/81
[58] Field of Search ............... 425/382; 264/DIG. 75, 264/51–59, 29.3, 89; 428/304.4; 501/80, 81

[56] References Cited

U.S. PATENT DOCUMENTS

| 1,956,607 | 5/1934 | Wyatt et al. | 264/DIG. 75 |
| 3,417,431 | 12/1968 | Majoch | 425/382 |
| 3,782,878 | 1/1974 | Hudson | 425/382 |
| 3,949,031 | 4/1976 | Fairbanks | 425/382 |
| 4,010,233 | 3/1977 | Winter et al. | 264/65 |

*Primary Examiner*—Jay H. Woo
*Attorney, Agent, or Firm*—Oblon, Fisher, Spivak, McClelland & Maier

[57] ABSTRACT

The invention is concerned with a porous molding obtained by extruding a mixture containing at least one material selected from porous inorganic materials and carbonizable organic materials and at least one binder therefor in the form of threads or strings, accumulating the thready or stringy extrudates to form a mass, and then drying and sintering the accumulated mass. When the at least one material is an organic material, the sintered mass is carbonized in a non-oxidative atmosphere and then activated as usual.

13 Claims, 7 Drawing Figures

POROUS MOLDINGS MADE OF ACCUMULATED MASS OF STRINGY OR THREADY EXTRUDATES

BACKGROUND OF THE INVENTION

1. Field of the Invention

This invention relates to porous moldings and more particularly, to moldings of accumulated mass made of stringy or thready extrudates of porous materials.

2. Description of the Prior Art

In recent years, applications of porous inorganic materials have rapidly been developed and such materials are now widely employed mainly in the fields such as filter media, adsorbents, acoustic materials, heat-insulating materials, carriers for catalyst and the like. The applications in these wide fields have been found to produce problems with respect to the handling and effects of materials when the materials are used as they are. Accordingly, they have been frequently employed after molding into pellets, beads, rings or honeycombs. These moldings are properly selected depending on the end use. For instance, in applications where the pressure loss must be avoided such as with carriers for catalyst, the honeycomb structure is favorably employed. In this connection, however, the honeycomb structure is greatly restricted from the viewpoint of the manufacture technique and since the processing techniques such of dies and molding rollers have their own limitations, it is almost impossible to obtain a structure having more than a certain degree of fineness. For instance, with the molding process using dies, the thickness of cell wall is limited to about 100μ and even with the roller molding means, it is difficult to make the thickness below 50μ. After all, it is generally accepted that the limit of the number of cells per square inches is about 1000. Under these circumstances, attention has been again given to pellets or beads, which are admixed with binders and then press molded. These press moldings contain very fine voids or interstices therein, showing an advantage that when this molding is used, for example, as carrier for catalyst, the effective surface area becomes much larger than that of the molding of the honeycomb structure. However, it is necessary to use binders two times at the stage of molding pellets themselves and the stage of the secondary molding and thus there is a fear that such binders give adverse influences not only on the porosity of product but also on mechanical strengths. In addition, the press molding is conducted after once molded pellets have been reduced to pieces and sifted and thus requries twice the steps even in molding operation, inviting the rise of processing cost.

SUMMARY OF THE INVENTION

It is accordingly an object of the present invention to provide a porous molding of the novel type which overcomes the above-described drawbacks of the prior art.

It is another object of the invention to provide a porous molding which can be obtained by a single stage operation of molding and which has a very fine void or pore structure which is superior to that of the honeycomb structure and comparable to that of the press molding.

The above objects can be achieved, according to a broad aspect of the invention, by a molding obtained by a process which comprises providing a blend or mixture of at least one member selected from porous inorganic materials and organic materials capable of being carbonized and at least one binder, extruding the mixture in the form of threads or strings into a container of a given shape to form an accumulated mass therein, drying the accumulated mass, and sintering the dried mass or in the case of the organic material, carbonizing the dried mass in a non-oxidative atmosphere whereby the stringy or threadily extruded materials themselves have fine pores therein and have also voids established among the extruded materials.

The above and other objects, features and advantages of the present invention will become apparent from the following description and the appended claims, taken in conjunction with the accompanying drawings.

DETAILED DESCRIPTION AND PREFERRED EMBODIMENTS OF THE INVENTION

Figure 1:
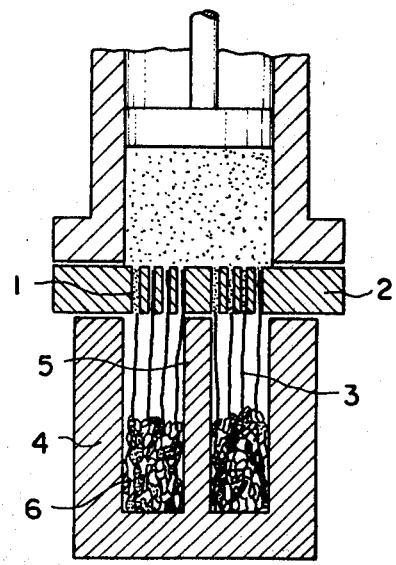
FIG. 1 is a schematic sectional view of a part of an apparatus of manufacturing a molding according to the invention.

The porous inorganic materials used as the starting materials for the molding according to the invention are those which are solid and have a multitude of small pores in the inside and/or surfaces thereof. Any materials which satisfy the above requirements can be utilized irrespective of the origin or process of manufacture thereof. Typical examples of these materials include synthetic and natural zeolites, γ-alumina, silica gel, silica-alumina, boehmite, active titania, active carbon, molecular sieving carbon and the like. These porous inorganic materials are ordinarily available in the form of particles or powders.

Aside from the above-described porous inorganic materials, there may be used organic materials in the practice of the invention. The organic materials include all the natural and synthetic organic materials which can be carbonized in a non-oxidative atmosphere. From carbonization, a multitude of fine pores or voids are formed in the materials. The materials which have high ability for forming fine pores therein are organic, high molecular weight compounds or polymers having cyclic groups such as saturated carbon cyclic groups, saturated heterocyclic groups, aromatic groups, unsaturated heterocyclic groups and the like. Preferable examples of these materials are thermosetting resins and include phenolic resins, furan resins, aniline resins, xyleneformaldehyde resins, melamine resins and the like.

In the practice of the invention, the porous inorganic materials or organic materials are admixed with binders in a suitable medium to give viscous dispersion or suspension and the viscous suspension is threadily extruded into a container or mold and allowed to be accumulated to give an extrudate mass. When the organic materials are used as the starting material, it is preferable that the organic material be in the form of particles or powders on mixing with binder. Especially when the thermosetting resins are employed, it is desirable that the resins are first formed into fibers, then ground to pieces and kneaded with binder. The threadily extruded material or thready extrudate obtained from this mixture includes the fibers entangled with one another, so that the molding consisting of these thready extrudates contain a variety of voids or pores therein, e.g. fine pores formed in the resin material itself, voids established between the fibers, and voids established among the threadily extruded materials or by accumulation of the threadily extruded material on itself, showing a more effective function as the porous molding.

The binders used in the present invention are not limited to any specific ones and any materials which function to bind the particles or powders together can be utilized. Typical examples of the binder include organic binders such as MC, CMC, starch, CMS (carboxymethyl starch), HEC (hydroxyethyl cellulose), HPC (hydroxpropyl cellulose), sodium ligninsulfonate, calcium ligninsulfonate, polyvinyl alcohol, acrylic esters, methacrylic esters, phenolic resins, melamine resins and the like, and inorganic binders such as water glass, colloidal silica, colloidal alumina, colloidal titanium, bentonite, aluminium phosphate and the like. Needless to say, these binders may be used singly or in combination. The content of the binder is preferably in the range of below 35 wt% of all the mixture components on the dry basis. Larger contents are unfavorable since the mechanical strengths of the sintered product are lowered with attendant lowering of porosity as will be described hereinafter. The mixing or kneading of the mixture may be conducted by any of known devices. In the case where the extrusion is carried out using a screw extruder, the kneading is feasible by the use of the screw of the extruder. The thus kneaded mixture is then extruded in the form of a thread, string or wire by the use of the screw extruder or plunger extruder. The extruder is designed to have discharge dies provided with one to several nozzles or orifices and the thready or stringy extrudates have a shape and size in correspondence with the sectional shape and sectional area of the nozzle.

Figure 7:
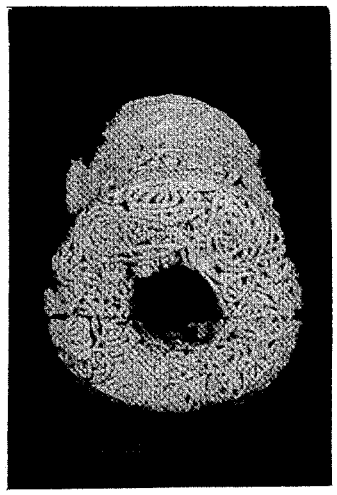
FIG. 7 is a perspective view of a molding product according to the invention.

Referring now to the accompanying drawings, there is schematically shown in FIG. 1 a part of an extruder E illustrating the manufacture of the molding according to the invention. The extruder E includes discharge dies 2 formed with a plurality of nozzles or orifices 1 which are round in section and from which a plurality of stringy materials 3 are extruded. Below the discharge dies 2 is placed a molding die 4. The stringy materials 3 from the nozzles 1 are accomodated and filled in the die 4, within which they are accumulated while being wriggled in arbitrary directions. When the die 4 is filled with the extruded materials or extrudities 3, the extrusion operation is stopped. In the figure, at the center of the molding die 4 is formed a projection rod 5 and thus the accumulated molding mass 6 is shaped in the form of a hollow cylinder, with an appearance after sintering as shown in FIG. 7. In the molding apparatus of FIG. 1, the stringy materials 3 are forced towards the direction of exertion of gravity but even when an extruder in which the extrusion is conducted in a horizontal direction is employed, it is stopped when the stringy materials 3 is completely filled in the molding die 4. Thus, the use of such extruder involves substantially no inconvenience in practice. The obtained accumulated mass is then dried by a suitable manner.

After the drying, the mass made of the inorganic material is subjected to sintering to obtain a product. On the other hand, when the mass is made of an organic material, it is carbonized in a non-oxidative atmosphere and finally activated. The drying, sintering, carbonizing and activating conditions are varied depending on the type of starting material, the type of binder, and the shape and size of the accumulated mass and have to be optimumly determined for each mixture used. In general, the carbonization treatment is conducted on a non-oxidative atmosphere such as nitrogen, at temperatures ranging from 500° C. to 700° C. for 0.5–10 hours and the activation treatment is conducted in an activating atmosphere such as steam at temperatures ranging from 750° to 1050° C. for 0.1–5 hours.

Figure 4:
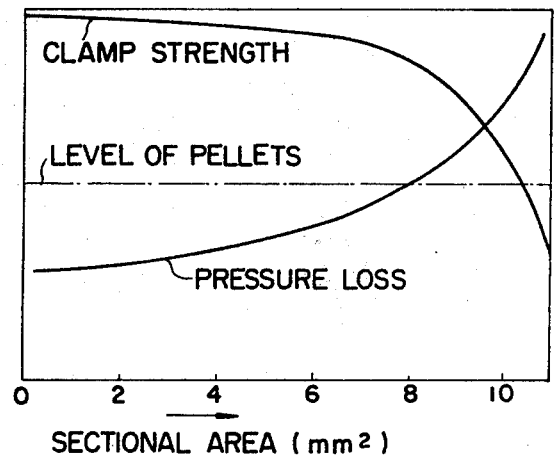
FIG. 4 is a graphical representation of a relation between the sectional area of a thready extrudate and physical properties.

The thus obtained product has both fine pores present in the extruded material or starting material itself and voids established between the extruded materials and formed by putting one extruded material on itself. As shown in FIG. 4, the aeration resistance (pressure loss) increases with an increase of the sectional area of the stringy extruded material (after sintering). It has been found that when the sectional area is over 8 mm$^2$, the level of pressure loss exceeds that attained when pellets are packed. The reason for this is considered due to that fact that the stringy materials with a large sectional area are ready to deform when packed in the molding die and thus brought into intimate contact with one another by the deformation, reducing the formation of voids. On the other hand, the clamp strength of the product shows little variation when the sectional area is below 8 mm$^2$ but is abruptly lowered when it exceeds 8 mm$^2$. This is because, by the deformation of the stringy, extruded materials internal cracks tend to be produced in the extruded materials after sintering, and thus the notch effect appears accompanied by the acute-angled deformations. The optimum sectional area should be selected depending on the shape in section of the extruded material or extrudate (circle, oval, semicircle, crescent shape, rectangle, rhomb, petal shape or star shape), the size and shape of the accumulated mass, the packing density of the extruded materials and the like. The extruded materials are more or less reduced in size when dried and pre-heated and it is recommended the discharge die be designed to have nozzles with a slightly larger diameter.

The product according to the invention may be applied to any of the fields described hereinbefore and show remarkable effects in those fields because of the presence of the fine pores and voids therein. However, when the product in which the ratio of capacity of these pores and voids (hereinafter referred to as porosity) is too small is applied, for example, as a carrier for catalyst, the surface area of catalyst becomes insufficient and satisfactory results can hardly be obtained. The porosity is generally in the range of above 0.2 cc/g when determined by the following mercury pressure-in method. That is, the sintered product from which gases present in the fine pores and voids have been completely removed is immersed in pure mercury and hermetically sealed, and then applied with a pressure to allow the mercury to be incorporated into the fine pores and voids, after which reduction of an apparent volume of the mercury is measured. This reduced value of the mercury is determined as the porosity. It will be noted that the above-mentioned value of porosity is merely an aim and even though the porosity is less thin 0.2 cc/g, it is possible to keep the total of the pores and voids at levels higher than required by increasing the volume of the entirety of the sintered product.

The extrusion of the thread-like materials is feasible even from only one nozzle provided in the discharge die but in view of the productivity, it is favorable to provide two or more nozzles from which a corresponding number of the thready materials are extruded. In the latter case, the nozzles may be changed in shape and/or area in section from one another, permitting formation of the extrudates of different shapes and/or areas in section. Accordingly, there can be obtained a variety of products depending on the use.

Figure 2:
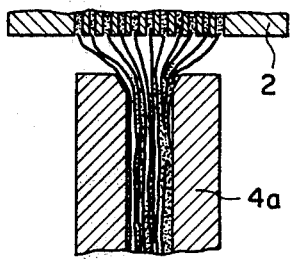
FIG. 2 is a schematic sectional view of an essential part of the apparatus.
Figure 3:
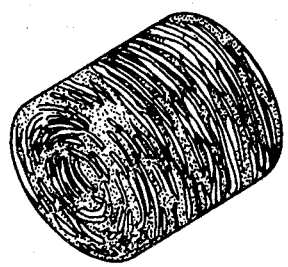
FIG. 3 is a schematic perspective view showing an example of the molding product according to the invention.

In FIG. 1, the accumulated mass is shown such that the thready extrudates are wriggled in arbitrary directions within the container or mold. Alternatively, the extrudates may be taken into a bundling die or mold 4a and bundled therein as shown in FIG. 2, followed by cutting in a suitable length. Still alternatively, in FIG. 1, either of the discharge dies 2 or the molding die 4 is rotated during the course of the extrusion to permit the extrudates to be convolutely wound around the projection rod thereby giving a molding product as shown in FIG. 3.

Especially when the molding product according to the invention is applied as a filter medium for dehydration, it is preferable to use zeolite as the starting material for the molding.

We have made an extensive study on the coefficient of moisture absorption in relation to the content of zeolite. As a result, it has been found that the content should be above 20% of the mixture composition on the dry weight basis. That is, less contents than 20% result in a considerably low level of moisture absorptibity, which is inferior to that of known silica gel filter media for dehydration. The zeolite may be of either synthetic or natural origin. As a matter of course, inorganic porous materials other than zeolites may be used in combination so far as the content of zeolite is within the above-defined range.

The zeolites are ordinarily available in the form of particles or powders. When extruded in the form of threads or strings, the zeolite is admixed with binders as described hereinbefore. In addition, the molding product after sintering should have a compression strength sufficient to stand use. In practice, the product is required to have the strength of at least above 5 kg/cm$^2$ in order that it is fixedly secured within a container by springs or similar means to withstand compression and vibrations over a long term. In this case, any binders which have been indicated hereinbefore may be used. In order to keep the compression strength at a suitable level, the type and content of binder remaining permanently after sintering have to be properly selected. Various binders including known permanent binders have been investigated from different angles and it has been found that the compression strength after sintering tends to become unsatisfactory unless at least one member selected from colloidal silica, colloidal alumina, colloidal alumina, aluminates (preferably alkali metal aluminates such as sodium and potassium aluminate), and white carbon and silicates (preferably alkali metal silicates such as sodium and potassium silicate) whose pH is in the range of 6–14 is present. In practice, it is most preferable to use all the four types of the binders mentioned above in combination. In this connection, however, no basis for determining relative proportions of these binders within certain ranges has been found in our study. If desired, permanent binders other than those mentioned above may be used, in combination including colloidal titanium, bentonite, alumina phosphate and the like. The total amount of the binders should be within a range defined hereinafter, and thus it is not favorable to use such other binders in large amounts.

Figure 5:
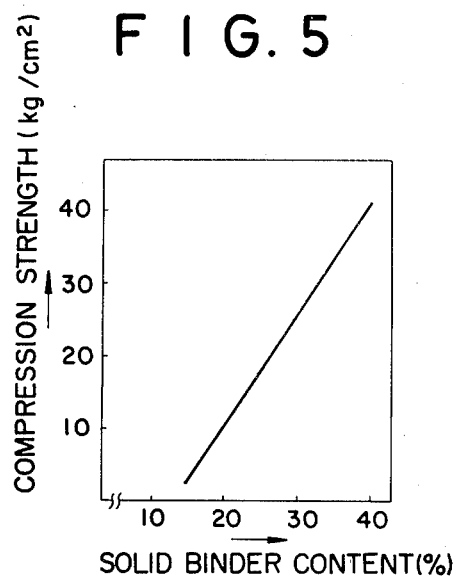
FIG. 5 is a graphical representation of a relation between the solid binder content and compression strength.
Figure 6:
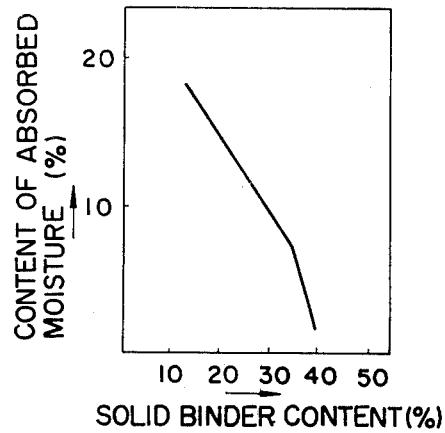
FIG. 6 is a graphical representation of a relation between the solid binder content and content of adsorbed moisture.

The solid content of the permanent binder remaining in the sintered product has a close relation with the compression strength of the product. This is clearly seen in FIG. 5 in which the compression strength proportionally increases with an increase of the solid binder content. However, the use of binder involves a disadvantage that the particles of zeolite are covered with a binder on the surface of each particle and this covering layer serves to lower the moisture absorptivity of the zeolite itself. In particular, when the solid binder content exceeds 35%, the amount of absorption of mositure is sharply reduced as shown in FIG. 6. Accordingly, the solid content of the permanent binder should be so controlled that a total amount of the binder solids is in the range of below 35%. As for the lower limit, it is necessary to take into account the fixation of the molding such as by springs as described above. In this sense, the sintered product should preferably be imparted with a minimal compression strength required for the above-mentioned purpose. To this end, it is not favorable that the solid content of binder be in the range of below 17%.

Aside from the inorganic binders remaining after sintering, the foregoing binders including other inorganic binders and organic binders may be optionally added so as to improve the kneadability of the starting materials and the extrudability of the kneaded material.

For the purpose of effectively displaying the function of the zeolite as the main component, the following additives may be aded. In case the zeolite molding according to the invention is used as a filter medium for dehydration in places where acidic substances or waxes serving to lower the adsorptivity of zeolite are produced, alumina and/or titanic acid is effective as an agent for removing the acidic substances and is added in an amount ordinarily employed in the art. When the zeolite molding is formed from the accumulated mass of thready extrudates, it is preferable that the sectional area of the extrudates is below 3.5 mm$^2$ so as to impart satisfactory dehydrating and filtering properties to the product. By this, it becomes possible to filter dusts with sizes in the order of several microns to several tens of microns.

The present invention is particularly described by way of examples, which should not be construed as limiting the present invention thereto.

EXAMPLE 1

Mixture of a porous inorganic material or powder and binders with compositions shown in Table 1 were prepared and each extruded by a procedure as shown in FIG. 1 to form an accumulated mass of thread-like extrudates, followed by drying and sintering. The amounts of the respective components are expressed in parts by weight. Each molding obtained was subjected to measurements of porosity and coefficient of water absorption with the results shown in Table 1. The coefficient of water absorption was determined by allowing each sample to stand at 25° C.×80% R.H. for 1, 3 and 6 days.

TABLE 1

| Experiment No. | 1 | 2 | 3 | 4 | 5 | 6 |
|---|---|---|---|---|---|---|
| Zeolite | 100 | 100 | 100 | 100 | 100 | 100 |
| Aluminium phosphate | 5 | 10 | 20 | 25 | 20 | 25 |
| Bentonite | 5 | 5 | 5 | 10 | 20 | 15 |
| CMC | 10 | 10 | 10 | 10 | 10 | 10 |
| Water | 30 | 30 | 30 | 30 | 30 | 30 |
| Porosity (cc/g) | 0.24 | 0.24 | 0.22 | 0.20 | 0.18 | 0.15 |
| Coefficient of water absorption (%) | | | | | | |
| 1 day after standing | 18 | 11 | 8 | 6.5 | 4.5 | 4 |
| 3 days after standing | 17 | 15 | 12 | 9.5 | 7.5 | 5.5 |
| 6 days after standing | 18 | 16 | 15 | 11 | 8 | 6 |

As is apparently seen from FIG. 1, there is a tendency for the porosity to decrease with an increase of the binder content, simaltaneously with the reduction of the water absorptivity. The sample of Test No. 1 using standard amounts of the binders shows a coefficient of water absorption as high as 18%, 6 days after the standing, which is believed to be more improved as compared with a known product (packed with pellets) whose coefficient is at most about 10%.

EXAMPLE 2

Starting materials were admixed in proportions as shown in Table 2 and kneaded, followed by forming an accumulated mass of thready extrudates according to the procedure of FIG. 1 and drying by hot air of 110° C. for 30 minutes. Then, each sample was cured under conditions of 200° C.×0.5 hours and carbonized and activated under conditions of 900° C.×2 hours. The test results are shown in Table 2 below.

TABLE 2

| Experiment No. | 1 | 2 | 3 | 4 | 5 | 6 | 7 |
|---|---|---|---|---|---|---|---|
| Lignin powder | 80 | | | | | | |
| Phenolic resin powder | | 90 | | | | | |
| Melamine resin powder | | | 90 | | | | |
| Furan resin powder | | | | 90 | | | |
| Coal powder | | | | | 80 | | |
| Shavings | | | | | | 70 | |
| Polyethylene resin powder | | | | | | | 90 |
| Phenolic resin binder | 15 | 8 | 8 | 8 | 18 | 25 | 8 |
| CMC | 5 | 2 | 2 | 2 | 2 | 5 | 2 |
| Methanol | 10 | 8 | 8 | 8 | 12 | 25 | 15 |
| Specific surface area (m²/g) | 980 | 1460 | 1150 | 1030 | 895 | 1020 | 50 |
| Porosity (c.c./g) | 0.23 | 0.30 | 0.28 | 0.24 | 0.21 | 0.28 | 0.03 |
| Aeration resistance (mmAq) | 150 | 95 | 90 | 90 | 180 | 205 | 3000 |
| Filtration performance (μ) | 12 | 5 | 30 | 35 | 35 | 40 | 100 |

The filtration performance indicated in Table 2 was determined as follows. That is, a model dust was prepared so as to check the collectability of dust floating on water and suspended in water. This suspension was passed through each molding and the upper limit in size of non-collected particles was determined as the filtration performance and expressed by the particle size (μ).

EXAMPLE 3

Starting materials with compositions shown in Table 3 were kneaded and solid matter in each composition were removed by means of a strainer, followed by extruding into thread-like extrudates from dies with 10 nozzles per square inches, each nozzle having a sectional area of 0.24 mm². The resulting mass was dried and sintered at 550° C. for 2.5 hours to obtain a molding for use as a filter medium for dehydration. The sectional area of the thread-like extrudate is indicated in the bottom of the table. These moldings were each subjected to the measurements of physical properties and performances thereof with the results shown in Table 3.

The coefficient of the water absorption was measured as follows: A sample was regenerated under conditions of 400° C.×1 hour and then allowed to stand in a thermostatic oven of 30° C.×80% R.H. for 48 hours, followed by measuring an increment of moisture by adsorption. The filterability was determined using a test dust prescribed in JIS Z8901. That is, this dust was suspended in solvent and passed through a test container using the molding sample. The filtrate obtained after the passage was subjected to as analysis of particle size and a miximum size (μ) was determined as the filterability.

Experiment Nos. A and B are examples which satisfy the conditions required in the invention and show maximal levels of the characteristics. The molding of Experiment No. C in which silica gel is used instead of zeolite is very poor in water absorption and also in absorption of HCl. Experiment Nos. D and J make use of zeolite and the water absorptions of these moldings are higher than that attained by silica gel alone (Experiment No. C). In Experiment Nos. E-H, the content of zeolite is larger than in the case of Experiment No. D, and the water absorption is improved very much. The molding of Experiment No. F is slightly reduced in compression strength since the solid content of the permanent binders in the molding is small but its moisture absorption is improved over that of Experiment No. G in which the same level of zeolite is contained. The molding of Experiment No. I contains a larger amount of zeolite but the solid content of the permanent binders in the molding is too large, so that though the compression strength is high, the moisture absorption is considerably reduced. In Experiment No. K, the content of zeolite is less than the lower limit of the invention, with the result that the moisture absorption is very poor.

The moldings of Experiment Nos. D-J and L contain titanic acid or γ-alumina, and show good HCl absorptivity. The molding of Experiment J further contains active carbon, so that the oil absorptivity is much improved. It will be noted that in the molding of Experiment No. L, the sectional area of the threads is too great, leading to poor filterability (see FIG. 7).

TABLE 3

| Experiment No. | | A | B | C | D | E | F | G | H | I | J | K | L |
|---|---|---|---|---|---|---|---|---|---|---|---|---|---|
| Starting Materials | | | | | | | | | | | | | |
| Effective Components | Zeolite | 100 | 100 | — | 20 | 80 | 60 | 60 | 60 | 60 | 25 | 15 | 60 |
| | Silica gel | — | — | 100 | — | — | — | — | — | — | — | 85 | — |
| | γ-Alumina | — | — | — | — | 20 | 40 | 40 | 40 | 40 | 25 | — | 40 |
| | Titanic acid | — | — | — | 80 | — | — | — | — | — | — | — | — |
| | Active carbon | — | — | — | — | — | — | — | — | — | 50 | — | — |

TABLE 3-continued

| Experiment No. | | | A | B | C | D | E | F | G | H | I | J | K | L |
|---|---|---|---|---|---|---|---|---|---|---|---|---|---|---|
| Permanent Binder | Colloidal silica | (solid content 30%) | 27 | 24 | 27 | 27 | 27 | — | — | 28 | — | 27 | 27 | 27 |
| | White carbon | (solid content 97%) | — | — | — | — | — | 5 | 8 | — | 13 | — | — | — |
| | Colloidal alumina | (solid content 15%) | 80 | 71 | 80 | 80 | 80 | 47 | 80 | 82 | 127 | 80 | 80 | 80 |
| | Sodium aluminate | (solid content 30%) | 23 | 20 | 23 | 23 | 23 | 13 | 23 | 24 | 37 | 23 | 23 | 23 |
| | Sodium silicate | (solid content 25%) | 28 | 25 | 28 | 28 | 28 | 16 | 28 | 29 | 44 | 28 | 28 | 28 |
| | Potassium silicate | (solid content 25%) | 32 | 28 | 32 | 32 | 32 | 20 | 32 | 33 | 52 | 32 | 32 | 32 |
| | Solid content of permanent binder in molding (%) | | 30 | 15 | 30 | 30 | 30 | 20 | 30 | 35 | 40 | 30 | 30 | 30 |
| CMC | | | 10 | 10 | 10 | 10 | 10 | 10 | 10 | 10 | 10 | 10 | 10 | 10 |
| Properties | | | | | | | | | | | | | | |
| Moisture absorption (%) | | | 17.0 | 21.0 | 3.0 | 3.5 | 14.0 | 16.0 | 11.5 | 7.6 | 2.5 | 5.1 | 2.5 | 13.0 |
| Compression strength (kg/cm$^2$) | | | 26.5 | 2.3 | 28.0 | 22.0 | 25.5 | 9.5 | 24.0 | 35.2 | 40.1 | 22.0 | 25.3 | 26.3 |
| HCl absorptivity (mol/g) | | | $2.0 \times 10^{-3}$ | $2.3 \times 10^{-3}$ | $1.3 \times 10^{-7}$ | $5.8 \times 10^{-2}$ | $4.3 \times 10^{-3}$ | $9.4 \times 10^{-3}$ | $8.9 \times 10^{-3}$ | $7.8 \times 10^{-3}$ | $6.3 \times 10^{-3}$ | $1.4 \times 10^{-3}$ | $8.2 \times 10^{-4}$ | $8.3 \times 10^{-3}$ |
| Oil absorptivity (mg/g) | | | 5 | 6 | 3 | 8 | 6 | 8 | 7 | 7 | 7 | 129 | 4 | 8 |
| Filterability (μ) | | | 53 | 57 | 45 | 49 | 73 | 80 | 98 | 51 | 76 | 40 | 49 | 135 |
| Sectional area of thread (mm$^2$) | | | 0.18 | 0.18 | 0.18 | 0.18 | 0.50 | 0.50 | 1.52 | 0.18 | 0.50 | 0.18 | 0.18 | 4.5 |

What is claimed is:

1. A porous molding produced by a process which comprises providing a mixture of at least one material selected from the group consisting of porous inorganic materials and organic materials capable of being carbonized and at least one binder therefor, forming an accumulated mass of thready extrudates of said mixture, and drying and sintering said accumulated mass, said porous molding having fine pores present in said thready extrudates themselves and voids established among said thready extrudates and formed by putting extrudates on themselves; wherein said thready extrudate has a sectional area of below 8 mm$^2$; and wherein the porosity of said porous molding is above 0.2 cc/g when determined from a reduction in volume of mercury by immersing said porous molding in mercury after degassing and applying a pressure to the mercury.

2. The porous molding according to claim 1, wherein said mixture is threadily extruded from a plurality of independent nozzles into a container of a given form to form an accumulated mass of the thready extrudates.

3. The porous molding according to claim 1, wherein the binder content in the mixture is below 35 wt% on a dry basis.

4. The porous molding according to claim 1, wherein said material is a porous inorganic material.

5. The porous molding according to claim 4, wherein said porous inorganic material is zeolite.

6. The porous molding according to claim 4, wherein said porous inorganic materials is at least one member selected from the group consisting of γ-alumina, silica gel, silica-alumina, boehmite, active titania, active carbon and molecular sieving carbon.

7. The porous molding according to claim 1, wherein the mixture is comprised of above 20 wt% of zeolite and below 35 wt% of at least one permenent binder having a pH of 6-14 and selected from the group consisting of colloidal silica, colloidal alumina, aluminates, white carbon and silicates.

8. The porous molding according to claim 7, wherein the mixture further comprises at least one additive selected from alumina, titanic acid and active carbon.

9. The porous molding according to claim 7, wherein the linear extrudate of said mixture has a sectional area of below 3.5 mm$^2$.

10. The porous molding according to claim 1, wherein said material is an organic material and the accumulated mass of the thready extrudates of the mixture containing said organic material is dried and then carbonized in a non-oxidative atmosphere.

11. The porous molding according to claim 1, wherein the carbonized mass is activated in an activation atmosphere.

12. The porous molding according to claim 10, wherein said organic material is a compound having cylic groups.

13. The porous molding according to claim 1, wherein said mixture is extruded in the form of threads from discharge dies having a plurality of independent nozzles into a container of a given shape while rotating either said discharge dies or said container thereby forming an accumulated mass of the thready extrudates.

* * * * *